July 30, 1940.  H. E. RUDD  2,209,706
INTERNAL COMBUSTION ENGINE
Filed June 10, 1937  2 Sheets-Sheet 1
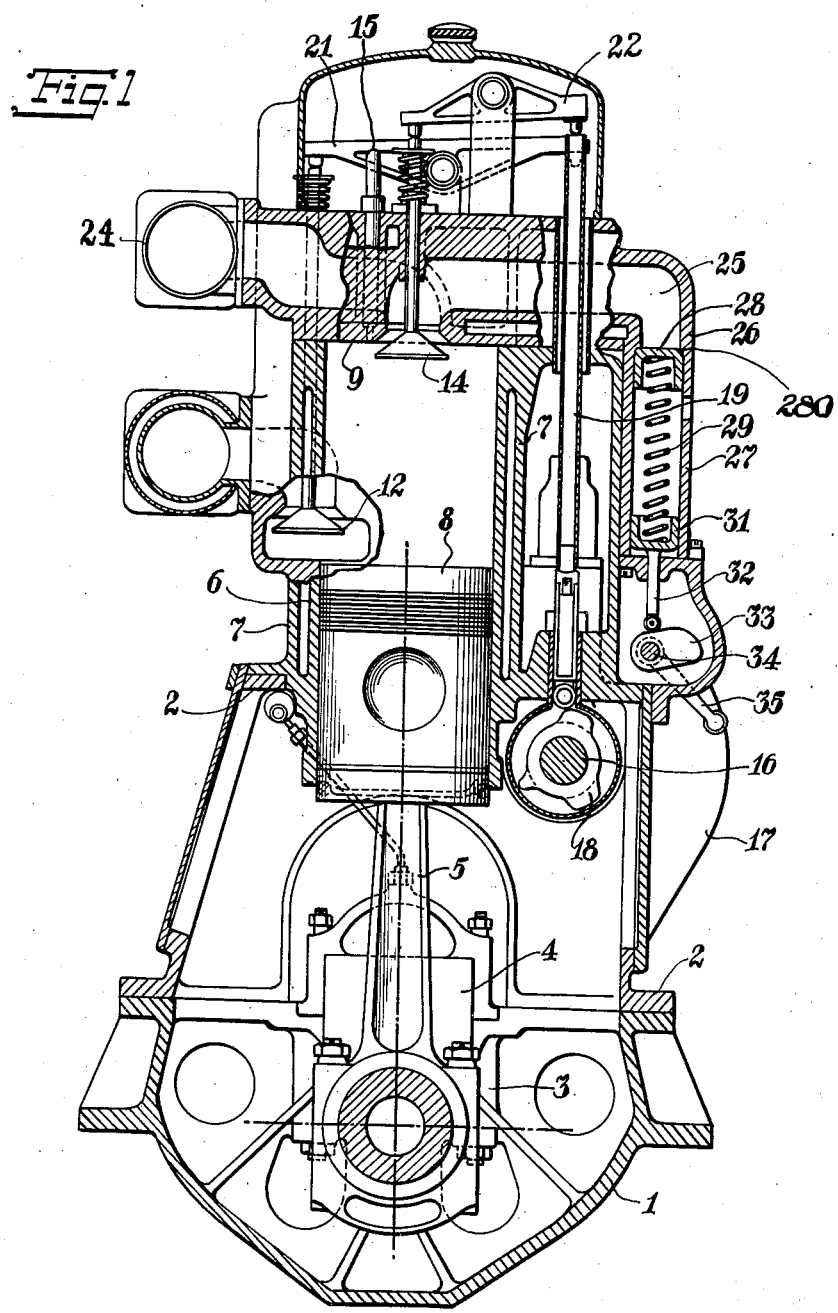
INVENTOR.
HAROLD E. RUDD
BY
ATTORNEY July 30, 1940.  H. E. RUDD  2,209,706
INTERNAL COMBUSTION ENGINE
Filed June 10, 1937  2 Sheets-Sheet 2
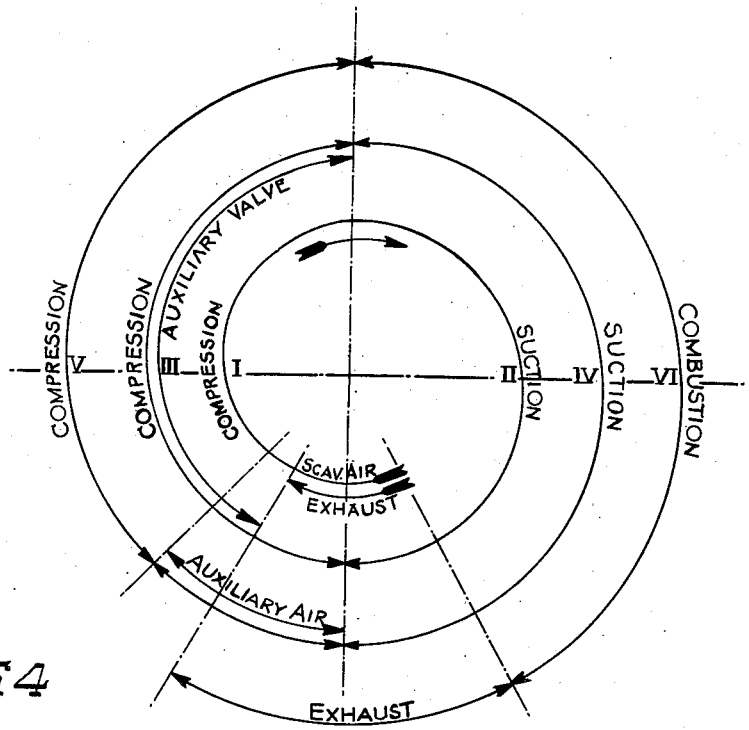
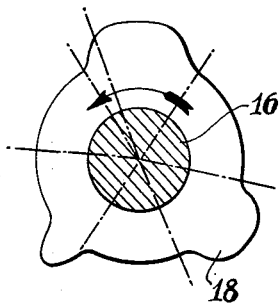
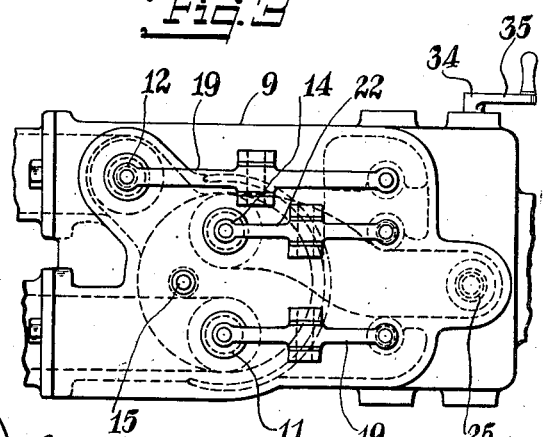
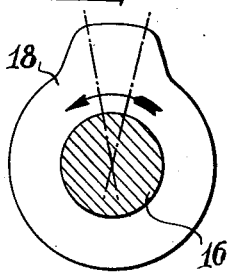
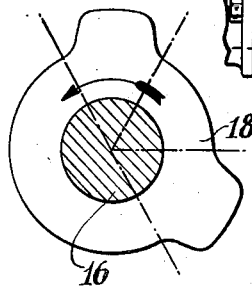
INVENTOR
HAROLD E. RUDD
BY
ATTORNEY

UNITED STATES PATENT OFFICE 2,209,706

INTERNAL COMBUSTION ENGINE

Harold E. Rudd, Boonton, N. J.

Application June 10, 1937, Serial No. 147,448

6 Claims. (Cl. 123—64)

This invention relates to internal combustion engines, and particularly to a modification of the Diesel type of combustion cycle in which there is utilized a six stroke cycle and means for the storage of air under pressure between successive strokes, in which the stored air is utilized for scavenging and another portion as a means for improving the flexibility of operation and ease of starting of the engine.

In the prior art of the construction of the Diesel type internal combustion engines, it has been customary to use either a two stroke cycle or a four stroke cycle for the operating procedure. Engines operating according to both of these cycles are in extensive commercial use, but neither cycle has been found wholly satisfactory for the Diesel principle, because of the lack of flexibility, the difficulty encountered in starting when the engine is cold, and in obtaining the high compression and temperature necessary to ignite the injected fuel when starting the cold engine.

Furthermore, difficulty is encountered in obtaining complete scavenging in both of the usual types of engines because of the necessary clearance volume and other requirements. Thus a fully satisfactory means for obtaining the necessary compression pressure of five hundred pounds or more to the square inch, which is required for satisfactory ignition of injected fuel when starting the cold engine, has not been found easy of attainment, especially in engines designed for high engine speeds, in which instance large valve openings are necessary to permit of the correspondingly high gas speeds. Also, such engines are not flexible in their speed and power characteristics and the high pressures required for starting are continued at unnecessary high values during the normal load running of the engine.

The engine of this invention operates upon a six stroke cycle in which more than one stroke is utilized for compression in every cylinder, air from one compression stroke being stored in a valve controlled storage reservoir under pressure during a following suction stroke, and utilized in part to build up the compression pressure produced by the next succeeding compression stroke, to obtain the necessary compression pressure when starting; and utilized in part to obtain scavenging of the cylinder after the combustion stroke. The engine also has means for adjusting the compression pressure during normal running to the lowest value suitable for the load and temperature conditions.

Each cylinder with its storage reservoir is independent of other cylinders and does not require an auxiliary compression cylinder or cross connections to other cylinders. Thus, the engine may be constructed as a single cylinder type, or a multi-cylinder type, with any desired number of cylinders, either all in line, or in various V arrangements according to the cylinder number. Thus, in the engine of the invention each cylinder is provided with an auxiliary valve opening between the cylinder and a storage chamber, one chamber and valve being provided for each cylinder. The storage chamber is desirably provided with a spring supported piston which serves during starting to increase the volume of the chamber at high pressure and also serves as a relief valve in the event that excess pressure shall develop and as means for adjusting the compression pressure during running. During the starting the scavenging air is compressed by one stroke of the engine piston and restored in the storage chamber under the control of the auxiliary valve during the next subsequent suction. Thereafter a second charge of air is likewise compressed into the storage chamber, and a third charge of air is drawn into the cylinder. The two stored charges are then returned in part to the cylinder at the beginning of the following, third, compression stroke, thereby increasing the amount of air in the cylinder for the third compression stroke, and increasing the ultimate compression pressure and compression temperature.

A portion of the air previously stored in the storage reservoir is retained under pressure therein, and after the third compression stroke and the combustion stroke, this residual stored air is utilized for the scavenging of the cylinder to clear it of combustion products preparatory to a new cycle.

An object of the invention is to operate an engine according to a controlled variable compression cycle.

Another object is to step up the compression pressure of an engine for starting when the engine is cold.

Another object of the invention is to operate an internal combustion engine on a six stroke cycle for each individual cylinder.

Still another object of the invention is to increase the compression pressure of an internal combustion engine by temporary storage of a charge from the preceding stroke in the same cylinder.

Still another object of the invention is to store a charge from a given cylinder and thereafter utilize a portion of the stored charge for increasing the compression pressure and to utilize another portion of the stored charge for scavenging of the same cylinder.

A further object is to control and adjust the compression pressure to the amount just sufficient for ignition of the fuel.

Fig. 1 is a side view in vertical section of an embodiment of the engine of the invention;

Fig. 2 is a stroke diagram of a cycle suitable for the embodiment of Fig. 1.

Fig. 3 is a top view of the cylinder head of the embodiment of Fig. 1, and

Figs. 4, 5 and 6 are a diagrammatic view of the valve cams of the invention.

Referring to the figures, particularly Fig. 1, the engine of the invention may consist of a bed plate member 1 upon which is mounted an engine frame 2 and journal bearings 3. The bearings 3 carry a crank shaft 4 upon the throw of which there is mounted a connection rod 5. The frame 2 supports a cylinder 6 having a water jacket 7. Within the cylinder 6 there is positioned a piston 8 upon the end of the connecting rod 5. A cylinder head structure 9 is provided with valves therein as shown in Fig. 3. These valves desirably consist of an intake valve 11, and an auxiliary valve 14. In addition, there is provided on the cylinder head 9 a fuel injection gear 15, which may take any desired form. The exhaust valve 12 is positioned in a passage connected with a port to the cylinder which is opened when the piston passes below it at the bottom of the stroke. Within the frame 2 there is provided a camshaft 16 which is driven from the crank shaft 4 through gears within gear case 17. These gears have a ratio of 3 to 1, in order that the camshaft 16 may complete one revolution during three revolutions of the crank shaft 4. Cams 18 are provided upon the shaft 16 for the operation of the valve push rods 19. The intake and exhaust valves 11 and 12 are operated by their respective push rods 19 through rocker arms 21 and the auxiliary valve 14 is operated from a push rod 19 through a rocker arm 22. It is to be noted that the cam 18 which operates the push rod and rocker arm for the exhaust valve 12 has but one "land" or lobe or elevated portion; whereas, the cam for the intake valve 11 has two "lands" or elevated portions, and the cam for the auxiliary valve 14 has three "lands" or raised portions. The cylinder head 9 has the usual port and passage leading to an intake header 24; and, in addition, a storage chamber 25 is provided partly in the head member 9 and partly in an attached chamber member 26. Access to the storage chamber 25 is had through the auxiliary valve 14. The chamber 25 has, in addition, a cylindrical extension 27 within which there is positioned a piston valve member 28 operating under the control of a spring 29 against port 289. The spring 29 is supported upon a carrier member 31 having a push rod 32 adapted to be operated by a cam 33 upon a shaft 34. The shaft 34 may be actuated by the hand lever 35.

In the operation of this embodiment of the device of the invention, the engine may first be turned over by the starter, without fuel injection, and with the cam 33 turned to the lowest position, to free the piston valve 28, and allow a portion of the air charge to pass out of the storage chamber, to reduce compression to a minimum for a few revolutions, thereby reducing the load upon the starter, and permitting the engine to come up to starting speed with a minimum expenditure of time and power. As the pressure builds up in the storage reservoir 25 from air compressed thereinto by the piston 8, and reaches a value which exceeds the pressure of the spring 29, the piston 28 moves downward thereby increasing the volume of the reservoir 25; and, if the spring 29 is fully released by the cam 33, the piston 28 may move downward sufficiently far to uncover the outlet port shown while storing air in the chamber 25 at a pressure lower than normal operating pressure. When the port shown is uncovered the excess air is exhausted through it past the piston 28. The exhausting of a part of the stored air through the port reduces the amount to be mixed subsequently with the second charge of fresh air thereby reducing the total amount compressed and in consequence reducing the final compression pressure. This effect in combination with the variable volume of the chamber 25 obtained by movement of the piston 28 gives a range and adjustment of compression pressure which is otherwise unobtainable. When the engine has been brought up to speed by the starter, there is sufficient energy stored in the fly-wheel to obviate the necessity for reduced compression pressure and the spring 29 may be compressed by the cam 33. If, however, the engine is fully warmed up and operating under light load, the spring may be partly released to reduce the compression pressure, since under such operating conditions the full compression pressure is not necessary. Thereupon the cam 33 is turned to compress the spring 29 and hold the valve 28 on its seat and the successive compression cycles compress air into the storage chamber 25. The starting cycle may be regarded as continuing from lower dead center during the exhaust portion of the cycle. As is shown in Fig. 2, the exhaust valve is open, and as the crank shaft rotates the auxiliary valve 14 is opened just before the bottom end of the combustion stroke is reached. The opening of the valve 14 permits the passage of residual air under pressure from the storage chamber 25 into the cylinder above the piston 8. At a point about 30° past the lower dead center the exhaust valve 12 closes, while the auxiliary valve 14 remains open. Accordingly, the clear air discharged from the reservoir 25 is returned to the reservoir. At the end of the first upward stroke the auxiliary valve 14 closes, and the intake valve 11 opens. The piston then moves downward drawing in a charge of fresh air. At the end of this suction stroke the intake valve 11 closes. The auxiliary valve 14 may be opened immediately thereafter as the piston begins its second upward stroke. In most instances, however, it is preferable that the opening of the valve 14 be delayed until the compression pressure in the cylinder has reached approximately a pressure equal to that in the reservoir 25. In either case, the valve 14 is opened at one point or the other and the air in this cylinder, which is a second charge of air, is forced into the reservoir 25. At the close of the second upward stroke, the auxiliary valve 14 closes and the intake valve 11 reopens. The second downward stroke of the piston then draws in still another charge of fresh air and at the end of the downward stroke the intake valve 11 again closes. The piston then starts upward upon the third stroke, and the auxiliary valve 14 is opened immediately, allowing the greater portion of the air in the reservoir 25 to return to the cylinder, thus increasing the pressure in the cylinder to a suitable starting pressure.

The auxiliary valve 14 is then closed as soon as an approximate pressure equalization between the reservoir 25 and the cylinder has occurred, or it may be closed somewhat earlier to retain a slightly larger amount of scavenging air in the chamber 25. The piston 8 then moves upward upon the third upward stroke, and compresses the air in the cylinder. This amount of air is equivalent to substantially two cylinders full of free air, and accordingly the compression pressure obtained when the piston is at the top of the stroke may be double or more than double that obtainable by the compression of a single cylinder charge of fresh air. Thus, the compression pressure is greater than is otherwise obtainable, and the volume of available air for the combustion of the fuel is greatly increased. At this point, the fuel gear may be put into operation preparatory to the injection of fuel. When the piston 8 reaches or approaches the top of the stroke, the fuel supply valve 15 is opened and the charge of fuel introduced into the highly compressed air where it ignites and the combustion stroke begins. The piston moves downward under the urge of the combustion pressure produced in the cylinder by the oxidation of the fuel, and power is delivered to the crank shaft. At a point about 30° before the lower dead center, the exhaust valve opens to release the combustion pressure, and at a point just short of the lower dead center the auxiliary valve 14 is opened to permit the passage of scavenging air. The exhaust valve having been opened, the pressure of combustion gases in the cylinder is reduced nearly to atmospheric pressure and accordingly the air from the reservoir 25 passing the valve 14 tends to fill the cylinder and drive out the residual products of combustion, leaving the cylinder filled with substantially clear air free from products of combustion. Thereafter this cycle may be repeated until the engine is started, running with its own power and fully warmed up.

When the engine is fully warmed up, the cam 33 may be moved to release a part or all of the pressure upon the spring 29, and allow the valve 28 to open and discharge a portion of the air compressed in the reservoir 25, thereby reducing the compression pressure in the cylinder 8. The cam 33 may be adjusted to such a position that the air retained is just sufficient to produce in the cylinder 8 the minimum pressure and temperature which will ignite the fuel, thereby reducing the wear and pressures resulting from the compression to a minimum, while retaining ease of starting. This is accomplished by movement of the piston valve 28 under the control of the spring 29. Under the pressure in the storage reservoir 25 the piston valve 28 moves downward against the pressure of the spring 29 until the port 280 is opened for discharge of the excess air and when the auxiliary valve 14 is opened for the release of the stored air, the volume in the chamber 25 has been reduced by the venting through the port before the upward movement of the piston valve 28. By this procedure a substantial control is obtainable over the amount of air delivered from the chamber 25 to the cylinder 8, and accordingly over the compression pressure. This construction is of particular value for engines which are to be operated under varying atmospheric air pressure, as in airplane service, since it is possible to vary the volume of air stored, and the amount used for scavenging and also the compression pressure by adjustment of the piston 28 and spring 29.

This engine cycle is particularly advantageous for aeronautical engines and for high speed light weight engines generally. It is to be observed, however, that for maximum speed relatively large valves are required in order to pass the volume of gases required in the limited times available.

The device of the invention thus is an internal combustion engine of the Diesel type operating upon a controlled variable compression six stroke cycle. There is provided an adjustable storage reservoir for each cylinder to store air under pressure, and an operating cycle, which includes a second suction stroke and a second compression stroke for the storage of air in the reservoir and the utilization of the stored air to increase or step up the final compression pressure and the ignition temperature, thereby facilitating starting, and making possible adjustment to compensate for varying intake air pressures, and adjustment of the compression pressure to the minimum adequate value. This arrangement provides a maximum of flexibility of operation, which is much greater than that of the ordinary two or four cycle engines. The reduced compression pressure for ordinary running under load reduces or avoids the troublesome Diesel knock or "pinking" which occurs with the ordinary engines. The inventive members and the six stroke cycle above disclosed are particularly well adapted to incorporation in light weight engines of the Diesel type suitable for automotive, auto-marine and aeronautical service. For these purposes it is, of course, desirable that the members be made of the special alloy steels and that every precaution be taken for the saving of weight. In aeroplane service the structure is particularly desirable, since the available high compression permits of the carrying of overloads during take off, and the adjustable feature permits of the maintaining of full power at high altitudes.

While there are above described but a limited number of embodiments of the invention, it is possible to produce still other embodiments without departure from the inventive concept herein disclosed and it is, therefore, desired that only such limitations be imposed upon the appended claims as are stated therein or required by the prior art.

What I claim and desire to secure by United States Letters Patent is:

1. In an internal combustion engine, a cylinder, a piston therein, intake and exhaust passages thereto and control valve means cooperating therewith, and a variable volume auxiliary storage reservoir cooperating with said cylinder under the control of a valve means and means for opening said control valve for air acceptance periods and two air discharge periods, one discharge period for boosting the compression pressure and the other for discharging residual stored air to scavenge said cylinder.

2. In an internal combustion engine, a cylinder, a piston therein, intake and exhaust passages thereto and control valve means cooperating therewith, a variable volume auxiliary storage reservoir cooperating with said cylinder under the control of a valve means, and means for the control and actuation of said valves comprising a cam shaft and cams thereon, the cam for the valve in said exhaust passage having one lobe, the cam for the valve in said intake passage having two lobes, and the cam for the valve associated with said storage reservoir having three lobes one thereof serving to discharge air to said cylinder for boosting compression, another serving to discharge residual stored air from said reservoir to said cylinder for scavenging said cylinder.

3. In an internal combustion engine, a cylinder, a piston therein, intake and exhaust passages thereto and control valve means cooperating therewith, a variable volume auxiliary storage reservoir cooperating with said cylinder under the control of a valve means, a crankshaft and connecting rod cooperating with said piston, a gear set having a three to one ratio drive from said crankshaft, and means for the control and actuation of said valves comprising a cam shaft connected to said gear set, and cams thereon, the cam for the valve in said exhaust passage having one lobe, the cam for the valve in said intake passage having two lobes, and the cam for the valve associated with said storage reservoir having three lobes one thereof serving to discharge air to said cylinder for boosting compression, another serving to discharge residual stored air from said reservoir to said cylinder for scavenging said cylinder.

4. In an internal combustion engine, a cylinder, a piston therein, intake and exhaust passages thereto and control valve means cooperating therewith, a variable volume auxiliary storage reservoir cooperating with said cylinder under the control of a valve means, means for opening said control valve for air acceptance periods and two air discharge periods, one discharge period for boosting the compression pressure and the other for discharging residual stored air to scavenge said cylinder, and a relief valve cooperating with said storage reservoir.

5. In an internal combustion engine, a cylinder, a piston therein, intake and exhaust passages thereto and control valve means cooperating therewith, and an auxiliary storage reservoir cooperating with said cylinder under the control of a valve means, means for opening said control valve for air acceptance periods and two air discharge periods, one discharge period for boosting the compression pressure and the other for discharging residual stored air to scavenge said cylinder, a relief valve cooperating with said storage reservoir, and adjustable spring loading means for controlling said relief valve.

6. In an internal combustion engine, a cylinder, a piston therein, intake and exhaust passages thereto and control valve means cooperating therewith, and an auxiliary storage reservoir cooperating with said cylinder under the control of a valve means, means for opening said control valve for air acceptance periods and two air discharge periods, one discharge period for boosting the compression pressure and the other for discharging residual stored air to scavenge said cylinder, a relief valve cooperating with said storage reservoir, and means for controlling said relief valve comprising a loading spring, and means for the adjustment thereof comprising a cam, a shaft, and manual means for the operation thereof.

HAROLD E. RUDD.